C. R. FRINK.
Hay Spreader.
No. 54,524.
2 Sheets—Sheet 1.
Patented May 8, 1866.
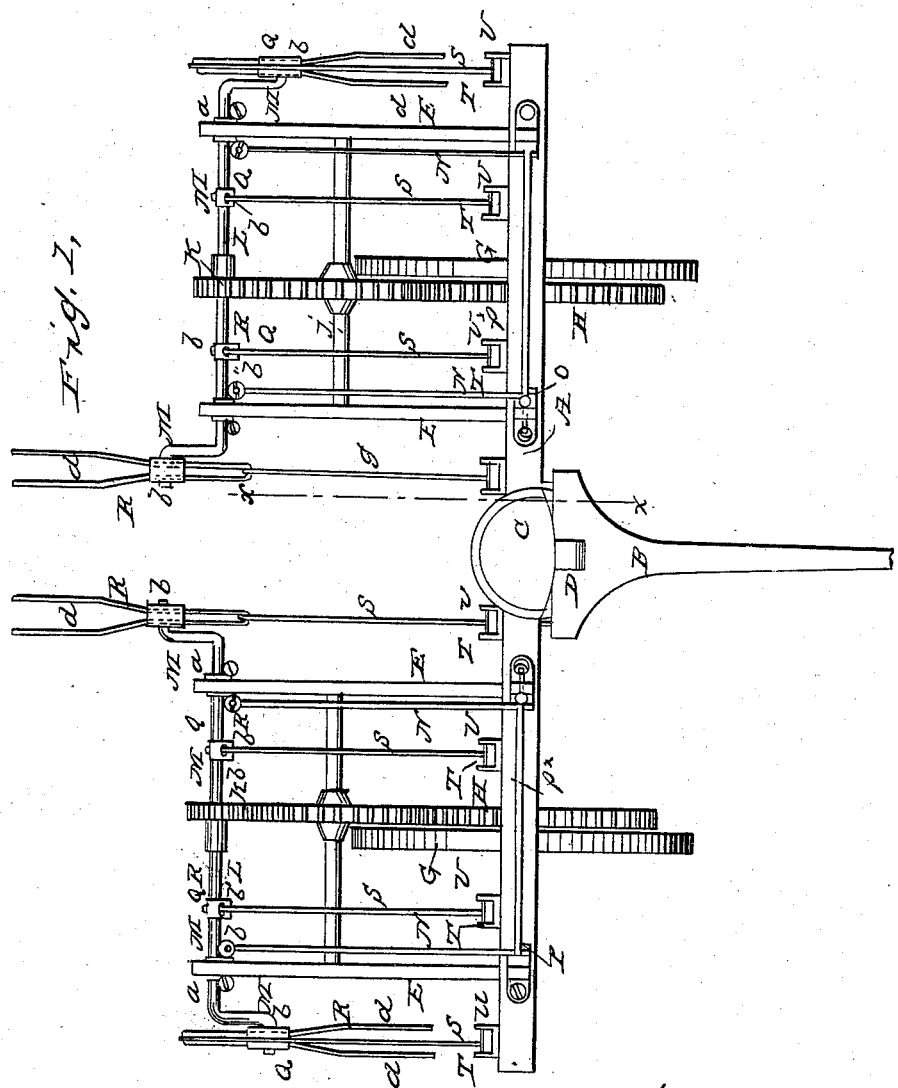

C. R. FRINK.
Hay Spreader.
No. 54,524.
2 Sheets—Sheet 2.
Patented May 8, 1866.
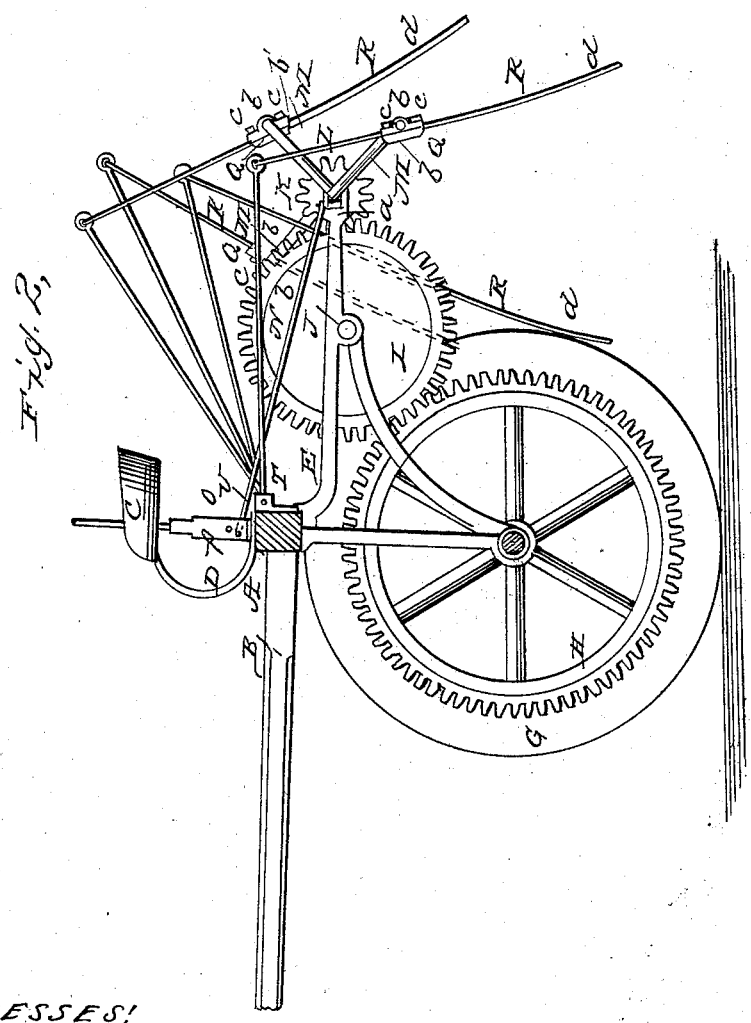
WITNESSES:
INVENTOR:

UNITED STATES PATENT OFFICE.

C. R. FRINK, OF NORWICH, NEW YORK.

IMPROVEMENT IN HAY-SPREADERS.

Specification forming part of Letters Patent No. 54,524, dated May 8, 1866.

*To all whom it may concern:*

Be it known that I, C. R. FRINK, of Norwich, in the county of Chenango and State of New York, have invented a new and Improved Hay-Spreading Machine; and I do hereby declare that the following is a full, clear, and exact description thereof, which will enable others skilled in the art to make and use the same, reference being had to the accompanying drawings, forming a part of this specification, in which—

Figure 1, Sheet No. 1, is a plan or top view of my invention; Fig. 2, Sheet No. 2, a side sectional view of the same, taken in the line $x\ x$, Fig. 1.

Similar letters of reference indicate like parts.

This invention relates to a new and improved device for spreading hay; and it consists in a novel manner of arranging the gearing and hanging or applying the same to the machine, as hereinafter fully shown and described, whereby the spreading-forks may be readily thrown in and out of gear, when desired, and the machine rendered very strong and durable.

The invention also consists in a novel manner of securing the spreading-forks to the crank-shaft, whereby the former may be readily adjusted higher or lower, so as to work nearer to or farther from the surface of the ground, as occasion may require.

A represents a bar, into the center of which the draft-pole B is framed at right angles. C is the driver's seat, which is secured upon the upper end of an elastic support, D, attached to the center of bar A, at the rear end of the draft-pole.

E represents cast-iron brackets, which are firmly bolted to the bar A. These brackets, of which there are four represented in this instance, have two arms, one extending out at right angles from the rear of bar A, and the other extending down at right angles with said bar, as shown clearly in Fig. 2. The lower ends of the vertical arms of these brackets serve as bearings for the axles F of the wheels G, on which the machine is mounted. Each of these wheels has a toothed rim, H, at its inner side, and these rims gear into wheels I on shafts J, the bearings of which are in the horizontal arms of the brackets E, at about the centers of said arms.

The wheels I, when the machine is in operation, gear into pinions K, which are on shafts L L, provided each with four cranks, M. The bearings $a$ of these shafts are fitted in slots in the outer ends of the horizontal arms of the brackets, and are allowed to slide therein to a certain extent to admit of the pinions K being thrown in and out of gear with the wheels I. The crank-shafts L are thus moved or adjusted, for the purpose specified, by means of rods N, attached at one end to the bearings $a$, and at the opposite end to levers O, and to arms P on shafts $P^x$, the inner rods, N, being attached to the levers O, and the outer ones to the arms P. The levers O are within convenient reach of the driver on seat C, so that the pinions K may be readily thrown in and out of gear with the wheels I when desired.

On each crank M of the shafts L L there are fitted boxes Q, composed of two longitudinal parts, $b\ b'$, connected together by screws $c$; and R represents the forks which act upon the hay, said forks being constructed of steel wire bent or doubled so as to form two prongs, $d\ d$, of equal length. These prongs are fitted in grooves made longitudinally in the adjoining sides of the parts $b\ b'$ of the boxes, and it will be seen that by loosening the screws $c$ the forks may be adjusted higher or lower, so as to work nearer to or farther from the surface of the ground, as may be desired. The upper ends of the forks R are connected to the outer ends of rods S, the opposite ends of which are fitted in small shafts T, having their bearings in boxes U, secured to the inner side of the bar A.

As the machine is drawn along the crank-shafts L L are rotated by the gearing described, and the forks R act upon and spread or scatter the hay, the rods S retaining the forks in proper position, and the cranks M having such a relative position with each other that they will operate consecutively upon the grass.

Forks have been arranged with cranks to operate in the manner substantially as herein described.

By my improvement a very compact, strong, and durable machine for the purpose specified is obtained.

The iron brackets E, which serve as bearings for the shafts and axles of the machine are an important feature, as they not only insure strength, but simplify and economize the construction of the machine.

Having thus described my invention, I claim as new and desire to secure by Letters Patent—

1. The metallic brackets E, attached to the bar A, and arranged, as shown, to serve as bearings for the axles F of the wheels G, and also as bearings for the shafts J L of the wheels I, and pinions K, substantially as and for the purpose set forth.

2. The arrangement of the sliding bearings $a$, brackets E, crank-shafts L, with levers N O, combined and operating in the manner and for the purpose herein specified.

3. The fitting of the forks R in boxes Q, placed on the cranks M of the shafts L L, and arranged in such a manner as to admit of the adjustment of the forks nearer to or farther from the surface of the ground, as may be desired.

The above specification of my invention signed by me this 1st day of December, 1865.

C. R. FRINK.

Witnesses:
   M. M. LIVINGSTON,
   C. L. TOPLIFF.